United States Patent
Li et al.

(10) Patent No.: US 12,207,194 B2
(45) Date of Patent: Jan. 21, 2025

(54) DATA SENDING AND RECEIVING METHOD AND APPARATUS AND STORAGE MEDIUM

(71) Applicant: ZTE CORPORATION, Shenzhen (CN)

(72) Inventors: Nan Li, Shenzhen (CN); Zhiqiang Han, Shenzhen (CN); Bo Sun, Shenzhen (CN); Dan Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 319 days.

(21) Appl. No.: 17/642,649

(22) PCT Filed: Sep. 10, 2020

(86) PCT No.: PCT/CN2020/114312
§ 371 (c)(1),
(2) Date: Mar. 11, 2022

(87) PCT Pub. No.: WO2021/047564
PCT Pub. Date: Mar. 18, 2021

(65) Prior Publication Data
US 2022/0361103 A1    Nov. 10, 2022

(30) Foreign Application Priority Data
Sep. 12, 2019    (CN) .......................... 201910865936.3

(51) Int. Cl.
*H04W 52/00*    (2009.01)
*H04W 28/06*    (2009.01)
*H04W 52/02*    (2009.01)

(52) U.S. Cl.
CPC ....... *H04W 52/0229* (2013.01); *H04W 28/06* (2013.01)

(58) Field of Classification Search
CPC .......................... H04W 52/0229; H04W 28/06
See application file for complete search history.

(56) References Cited

U.S. PATENT DOCUMENTS

2016/0127020 A1* 5/2016 Abraham .............. H04L 1/1829
370/312
2020/0404549 A1* 12/2020 Verma ................... H04W 24/10

FOREIGN PATENT DOCUMENTS

| CN | 109413672 A | 3/2019 |
| CN | 110024461 A | 7/2019 |

(Continued)

OTHER PUBLICATIONS

Cablelabs, "Considerations on LAA-LTE UL Transmissions without LBT" *3GPP TSG RAN WG1 Meeting* #83 R1-156983, Nov. 22, 2015 (Nov. 22, 2015), entire document.

(Continued)

*Primary Examiner* — Erika A Washington
(74) *Attorney, Agent, or Firm* — Morgan, Lewis & Bockius LLP (57) ABSTRACT

Provided are a data sending and receiving method and apparatus and a storage medium. The methods include sending a wireless signal that includes a trigger frame to one or more second communication nodes. The trigger frame is configured to trigger one or more second communication nodes to start transmission. The wireless signal carries at least one of first identifier information, second identifier information or third identifier information. The first identifier information is used to identify the sender of the trigger frame. The second identifier information is used to identify the receiver of the trigger frame. The third identifier information is used to identify that the trigger frame is configured to trigger the second communication node to start transmission.

17 Claims, 5 Drawing Sheets

(56) References Cited

FOREIGN PATENT DOCUMENTS

WO    WO-2017070487 A1    4/2017
WO    WO-2018125355 A1    7/2018

OTHER PUBLICATIONS

International Search Report for Application No. PCT/CN2020/114312, dated Dec. 16, 2020, 4 pages including English translation.
Extended European Search Report for Application No. 20863062.4, dated Aug. 24, 2023, 9 pages.
Park Eunsung et al: "Overview of PHY Features for EHT", IEEE 802. 11-18/1967 R1, IEEE-SA Mentor, Piscataway, NJ USA, Jan. 14, 2019 (Jan. 14, 2019), pp. 1-22, XP068159645, Retrieved from the Internet: URL:https://mentor.ieee.org/802.11 /dcn/18/11-18-1967-01-0eht-overview-of-phy-features-for-eht.pptx.
Simone Merlin (Qualcomm): "Trigger Frame Format", IEEE Draft; 11-15-0877-01-00AX-Trigger-Frame-Format, IEEE-SA Mentor, Piscataway, NJ USA, vol. 802.11ax, No. 1, Jul. 16, 2015 (Jul. 16, 2015), pp. 1-15, XP068119993, Retrieved from the Internet: URL:https://mentor.ieee.org/802.11/dcn/15/11-15-0877-01-00ax-trigger-frame-format.pptx.

* cited by examiner

| Send a wireless signal that includes a trigger frame to one or more second communication nodes | ∽S120 |

DATA SENDING AND RECEIVING METHOD AND APPARATUS AND STORAGE MEDIUM

CROSS-REFERENCE TO RELATED APPLICATIONS

This is a National Stage Application filed under 35 U.S.C. 371 based on International Patent Application No. PCT/CN2020/114312, filed on Sep. 10, 2020, which claims priority to Chinese Patent Application No. 201910865936.3 filed on Sep. 12, 2019, the disclosures of both of which are incorporated herein by reference in their entireties.

TECHNICAL FIELD

The present application relates to communications and, in particular, to a data sending and receiving method and apparatus and a storage medium.

BACKGROUND

In a wireless network such as a wireless local area network (WLAN), common devices are access points (APs) and non-AP stations (referred to simply as STAs). Generally, an AP establishes a basic service set (BSS), and an STA is associated with the AP through processes such as scanning, authentication and association.

In a traditional wireless local area network, one STA is associated with only one AP at any time. The associated AP stores information about the STA, such as association status and association information, an assigned association identifier, a key, a data packet sequence number, an established service flow identifier, and information about a frame confirmation protocol. The STA communicates with the associated AP, or communicates with other STAs through the associated AP, or communicates with other STAs not through the associated AP after direct communication is established. In another wireless local area network such as an independent BSS (IBSS), there is no access point, and all stations can communicate with each other directly.

APs or STAs in a wireless network may be collectively referred to as wireless communication nodes.

In a wireless network, (such as a WLAN), multiple APs can communicate with one or more STAs. In a network with multiple access points, it is urgent to solve the problem of how an access point configures the sending address and the receiving address of sent data to enable a non-receiver of the data to filter out the packet and achieve the purpose of saving power.

SUMMARY

Embodiments of the present application provide a data sending and receiving method and apparatus and a storage medium to enable a non-receiver of the data to filter out the data and stop receiving the data in time. Therefore, the purpose of saving power is achieved.

In a first aspect, an embodiment of the present application provides a data sending method. The method is applied to a first communication node.

The method includes sending a wireless signal that includes a trigger frame to one or more second communication nodes. The trigger frame is configured to trigger one or more second communication nodes to start transmission.

The wireless signal carries one or more of first identifier information, second identifier information or third identifier information. The first identifier information is used to identify the sender of the trigger frame. The second identifier information is used to identify the receiver of the trigger frame. The third identifier information is used to identify that the trigger frame is configured to trigger the second communication node to start transmission.

In a second aspect, an embodiment of the present application provides a data receiving method. The method is applied to a second communication node.

The method includes receiving a wireless signal that includes a trigger frame and is sent by a first communication node, parsing the wireless signal and starting transmission to one or more third communication nodes according to parameter information in the wireless signal.

The trigger frame is configured to trigger one or more second communication nodes to start transmission. The wireless signal carries one or more of first identifier information, second identifier information or third identifier information. The first identifier information is used to identify the sender of the trigger frame. The second identifier information is used to identify the receiver of the trigger frame. The third identifier information is used to identify that the trigger frame is configured to trigger the second communication node to start transmission.

In a third aspect, an embodiment of the present application provides a data receiving method. The method is applied to a third communication node.

The method includes receiving data or signaling transmitted by one or more second communication nodes.

In a fourth aspect, an embodiment of the present application provides a data sending apparatus. The apparatus is applied to a first communication node.

The apparatus includes a first sending module configured to send a wireless signal that includes a trigger frame to one or more second communication nodes. The trigger frame is configured to trigger one or more second communication nodes to start transmission.

The wireless signal carries one or more of first identifier information, second identifier information or third identifier information. The first identifier information is used to identify the sender of the trigger frame. The second identifier information is used to identify the receiver of the trigger frame. The third identifier information is used to identify that the trigger frame is configured to trigger the second communication node to start transmission.

In a fifth aspect, an embodiment of the present application provides a data receiving apparatus. The apparatus is applied to a second communication node.

The apparatus includes a first receiving module and a transmission module. The first receiving module is configured to receive a wireless signal that includes a trigger frame and is sent by a first communication node. The trigger frame is configured to trigger one or more second communication nodes to start transmission.

The transmission module is configured to parse the wireless signal and start transmission to one or more third communication nodes according to the parameter information in the wireless signal. The wireless signal carries one or more of first identifier information, second identifier information or third identifier information. The first identifier information is used to identify the sender of the trigger frame. The second identifier information is used to identify the receiver of the trigger frame. The third identifier information is used to identify that the trigger frame is configured to trigger the second communication node to start transmission.

In a sixth aspect, an embodiment of the present application provides a data receiving apparatus. The apparatus is applied to a third communication node. The apparatus includes a second receiving module configured to receive data or signaling transmitted by one or more second communication nodes.

In a seventh aspect, an embodiment of the present application provides a storage medium. The storage medium stores a computer program. When executed by a processor, the computer program causes the processor to perform the method according to any previous embodiment.

DETAILED DESCRIPTION

Embodiments of the present application are described below with reference to the drawings.

With the evolution of WLAN technologies, the next-generation WLAN supports communication between multiple APs and one or more STAs. The transmission of the multiple APs is generally triggered by a certain trigger entity, such as an associated AP of an STA. The associated AP sends a trigger frame in which a receiving address is a broadcast address to trigger the multiple APs to send data or signaling to one or more STAs. In this process, other STAs associated with the AP determine that the trigger frame is sent by their associated AP, and the receiving address is the broadcast address. Therefore, the STAs continue to parse the trigger frame. However, in fact, the trigger frame is not a trigger frame that triggers the STAs to send. As a result, the STAs consume a certain amount of power.

For this reason, the embodiments of the present application provide a data sending method to enable an AP to configure the sending address and the receiving address of sent data. Therefore, a non-receiver of the data can filter out the data, and the purpose of saving power is achieved.

Figure 1:
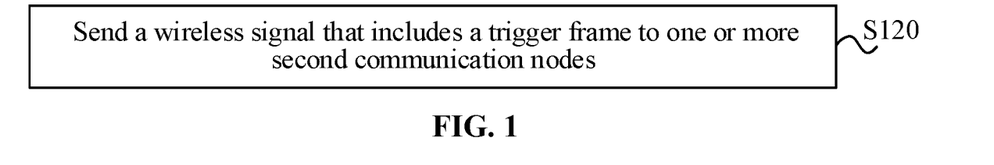
FIG. 1 is a flowchart of a data sending method according to an embodiment of the present application.

FIG. 1 is a flowchart of a data sending method according to an embodiment of the present application. This embodiment is performed by a first communication node.

As shown in FIG. 1, the method provided in this embodiment includes S120.

In S120, a wireless signal that includes a trigger frame is sent to one or more second communication nodes.

The trigger frame is configured to trigger one or more second communication nodes to start transmission. The wireless signal carries one or more of first identifier information, second identifier information or third identifier information. The first identifier information is used to identify the sender of the trigger frame. The second identifier information is used to identify the receiver of the trigger frame. The third identifier information is used to identify that the trigger frame is configured to trigger the second communication node to start transmission.

In this embodiment, the first communication node sends the wireless signal that includes the trigger frame to one or more second communication nodes. The trigger frame is configured to trigger one or more second communication nodes to start transmission. In an embodiment, the receiver of transmission of one or more second communication nodes is one or more third communication nodes. The information transmitted by the second communication node to one or more third communication nodes may be transmission data or transmission signaling.

In an embodiment, the first communication node is a node capable of wired or wireless communication with one or more second communication nodes. In an embodiment, the first communication node is the second communication node associated with the third communication node. In another embodiment, the first communication node is a central node capable of wired or wireless communication with multiple second communication nodes.

In an embodiment, the first communication node participates or does not participate in the transmission to the third communication node.

In an embodiment, the wireless signal carries one or more of the first identifier information, the second identifier information or the third identifier information, that is, the wireless signal may carry the first identifier information, the second identifier information and the third identifier information at the same time, or the wireless signal may also carry partial identifier information (for example, the first identifier information, the second identifier information, the third identifier information, the first identifier information and the second identifier information, the second identifier information and the third identifier information, or the first identifier information and the third identifier information). The identifier information may be flexibly combined. This is not limited in this embodiment.

This method is described by using an example in which multiple APs transmit to one or more STAs. It is to be noted that in this embodiment of the present application, the transmission of the multiple APs to one or more STAs may be started at the same time or not at the same time. When the multiple APs start transmission to one or more STAs at the same time, the signals transmitted by the multiple APs are exactly the same.

Figure 2:
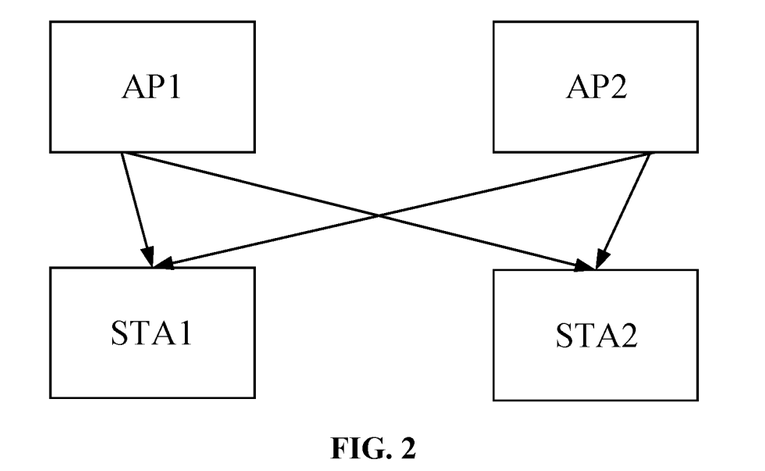
FIG. 2 is a diagram illustrating communication between multiple APs and multiple STAs according to an embodiment of the present application.

The communication process between the multiple APs and the multiple STAs is described by using two APs (AP1 and AP2) and two STAs (STA1 and STA2) as an example. FIG. 2 is a diagram illustrating communication between multiple APs and multiple STAs according to an embodiment of the present application. As shown in FIG. 2, the multiple APs communicate with the multiple STAs at the same time or not at the same time, that is, AP1 and AP2 may communicate with STA1 and STA2 at the same time, or AP1 and AP2 may communicate with STA1 at the same time, or AP1 and AP2 may communicate with STA2 at the same time.

Figure 3:
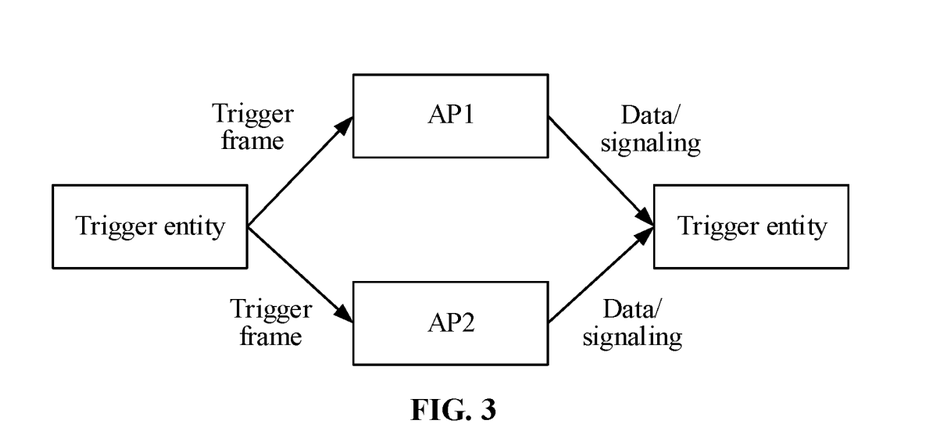
FIG. 3 is a diagram illustrating communication between multiple APs and one STA according to an embodiment of the present application.

In an example in which the multiple APs transmit to one STA at the same time, the simultaneous transmission of the multiple APs is triggered by a trigger entity. The entity may be an associated AP of the STA or a central node in a network. The central node may be capable of wired or wireless communication with the multiple APs and has the function of managing, coordinating and controlling the multiple APs. The multiple APs start to send to the STA at the same time to make the sending moments among the multiple APs aligned. Therefore, the signals among the multiple APs do not interfere with each other and do not affect the receiving of the STA. In this process, if the trigger process is completed through an air interface, it is necessary to send, to the multiple APs, frames with a function capable of triggering transmission (that is, trigger frames). FIG. 3 is a diagram illustrating communication between multiple APs and one STA according to an embodiment of the present application. As shown in FIG. 3, the trigger entity sends trigger frames to AP1 and AP2 to trigger AP1 and AP2 to start to transmit data or signaling to STA1.

Figure 4:
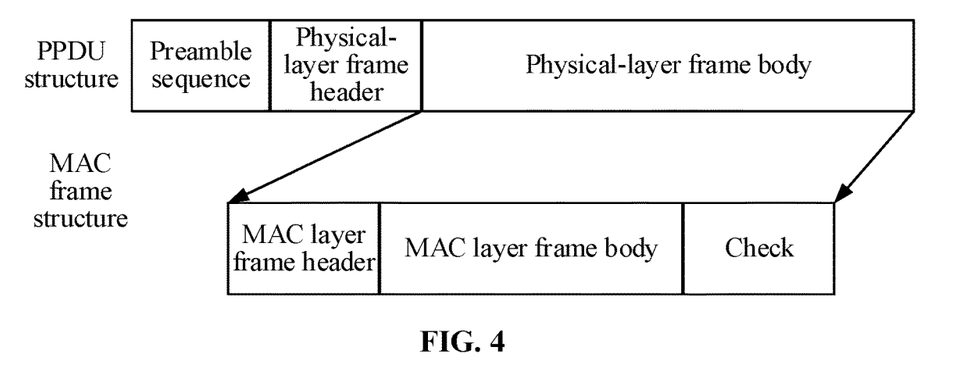
FIG. 4 is a diagram illustrating the structure of a physical layer protocol data unit (PPDU) of a WLAN according to an embodiment of the present application.

FIG. 4 is a diagram illustrating the structure of a physical layer protocol data unit (PPDU) of a WLAN according to an embodiment of the present application. As shown in FIG. 4, a physical layer protocol data unit (PPDU) transmitted in a wireless medium includes a preamble sequence, a physical layer frame header and a physical layer frame body. The physical layer frame header includes a physical layer signaling domain. The physical layer frame body includes a medium access control (MAC) frame. The MAC frame is composed of an MAC layer frame header, an MAC layer frame body and a check bit. The MAC frame has a sending address and a receiving address. In an embodiment, the first identifier information, the second identifier information and the third identifier information may be located in the physical layer signaling domain, that is, in the physical layer frame header of the PPDU structure. In an embodiment, the first identifier information, the second identifier information and the third identifier information may be located in an MAC layer signaling domain, that is, in the MAC layer frame header of the PPDU structure. In an embodiment, the first identifier information, the second identifier information and the third identifier information may be located in the MAC layer frame body.

In an embodiment, the first communication node and the second communication node are APs, and the third communication node is an STA. For example, the first communication node is AP1, and the second communication nodes are other access points. For example, the second communication nodes are AP2 and AP3, and the third communication node is STA1. AP1, AP2 and AP3 may be multiple APs in a wireless local area network environment, for example, a home network environment, a commercial environment or an industrial environment.

In this embodiment, STA1 is associated with AP1 through processes such as network scanning, authentication and association. During an association process, STA1 interacts with AP1 about the multi-AP capability information. In this embodiment, AP1 notifies whether AP1 supports multi-AP transmission and notifies the supported multi-AP transmission mode. The multi-AP transmission mode includes, but is not limited to, multi-AP joint transmission (multiple APs send to an STA at the same time), multi-AP selective transmission (one AP in the multiple APs is selected to send to the STA at a time), and multi-AP cooperative transmission (the multiple APs send to the respective associated STAs at the same time). In this embodiment, the multi-AP cooperative transmission includes cooperative orthogonal frequency division multiple access (OFDMA) and cooperative frequency multiplexing. STA1 notifies an AP whether the AP supports the multi-AP transmission and a supported multi-AP transmission mode.

Figure 5:
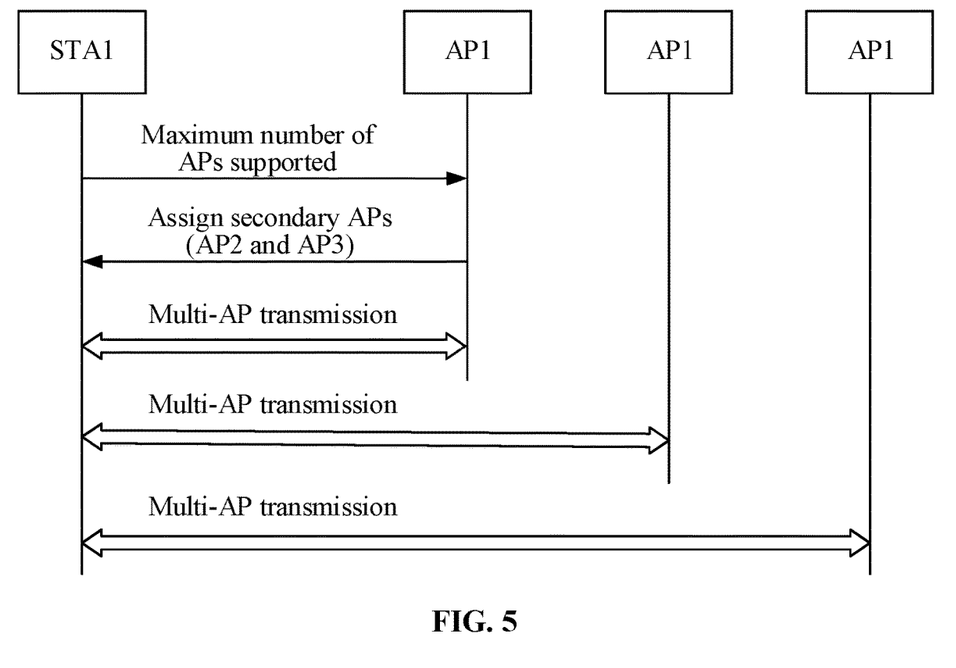
FIG. 5 is a diagram illustrating communication interaction between one STA and multiple APs according to an embodiment of the present application.

In an embodiment, the data sending method further includes receiving the maximum number of second communication nodes sent by the third communication node. The maximum number of second communication nodes is the maximum value of the number of the second communication nodes supportable by the third communication node. In this embodiment, in a scanning and association process, the third communication node sends, to the first communication node, the maximum value, supported by the third communication node, of the number of the second communication nodes. Therefore, when the transmission of multiple second communication nodes is performed, the first communication node can take the maximum number of second communication nodes as a condition when the first communication node configures other second communication nodes for the third communication node. FIG. 5 is a diagram illustrating communication interaction between one STA and multiple APs according to an embodiment of the present application. As shown in FIG. 5, AP1 associated with STA1 is designated as the primary AP of STA1. In a scanning and association process, STA1 notifies AP1 of the maximum value (that is, the maximum value of the number of APs), supported by STA1, of the number of the second communication nodes. Therefore, when the transmission of multiple APs is performed, AP1 can take the maximum value of the number of the second communication nodes as a condition when AP1 configures other APs for STA1. Other APs are designated as secondary APs of STA1. For example, the secondary APs configured by AP1 for STA1 are AP2 and AP3.

In an embodiment, in the case where the wireless signal carries the first identifier information, the method for obtaining the first identifier information includes one of the following: obtaining the first identifier information by calculating the medium access control (MAC) address of the first communication node according to a first preset algorithm or obtaining the first identifier information from a predetermined value range of an association identifier (AID) configured to be assigned to the third communication node.

In an embodiment, AP1 sends trigger frames to AP2 and AP3 to trigger AP2 and AP3 to start to transmit data or signaling to STA1 at the same time. The first identifier information is carried in a PPDU including the trigger frames to identify the sender of the trigger frames as AP1.

In this embodiment, there are multiple methods for obtaining the first identifier information. For example, the first preset algorithm may be one of the following methods: partially intercepting the MAC address, such as intercepting a high N bit or intercepting a low N bit, performing a hash operation on the MAC address, or performing an exclusive-OR operation on the MAC address and a predetermined string. In an embodiment, the first identifier information is a value obtained by calculating the MAC address of the first communication node according to the first preset algorithm. If one AP knows the MAC addresses of other APs, the AP may directly use the first preset algorithm to calculate the first identifier information of other APs. One AP may also directly send the first identifier information used by itself to other APs. In this embodiment, AP1 calculates its own MAC address by using the first preset algorithm to obtain the first identifier information used by AP1. If AP2 and AP3 know the MAC address of AP1, AP2 and AP3 may calculate the MAC address of AP1 by using the first preset algorithm to obtain the first identifier information used by AP1. Alternatively, AP1 notifies AP2 and AP3 of the first identifier information used by AP1 before sending the trigger frames to AP2 and AP3.

In an embodiment, the first identifier information is a value obtained from the predetermined value range of the AID configured to be assigned to the third communication node. In the case where the first communication node and the second communication node are APs, and the third communication node is an STA, the first identifier information is several values reserved from the predetermined value range of the AID configured to be assigned to the STA, that is, several values within the predetermined value range of the AID configured to be assigned to the STA are assigned to the APs. For example, the value range of the AID is 0 to N. 0 to M (M is less than or equal to N) values within the value range or N-M to N values within the value range may be assigned to and used by the APs. In this embodiment, the AID assigned to each AP may be determined by mutual negotiations among the APs. Alternatively, the AID assigned to each AP may be assigned by a specific entity in a network, such as a central node. Alternatively, the AID assigned to each AP is obtained from a one-to-one mapping between low-to-high (or high-to-low) ranked sizes of MAC addresses of the APs and positively ordered (or negatively ordered) AID values assigned to the APs.

In an embodiment, in the case where the wireless signal carries the second identifier information, a method for obtaining the second identifier information includes one of the following: obtaining the second identifier information by calculating the MAC address of the second communication node according to a second preset algorithm, obtaining the second identifier information from the predetermined value range of the AID configured to be assigned to the third communication node, receiving the value obtained by calculating the MAC address of the second communication node according to the second preset algorithm, or receiving the value obtained by the second communication node from the predetermined value range of the AID configured to be assigned to the third communication node.

In an embodiment, AP1 sends trigger frames to AP2 and AP3 to trigger AP2 and AP3 to start to transmit data or signaling to STA1 at the same time. The second identifier information is carried in a PPDU including the trigger frames to identify the receivers as AP2 and AP3.

In this embodiment, there are multiple methods for obtaining the second identifier information. For example, the second preset algorithm may be one of the following methods: partially intercepting the MAC address, such as intercepting a high N bit or intercepting a low N bit, performing the hash operation on the MAC address, or performing the exclusive-OR operation on the MAC address and a predetermined string. In an embodiment, the second identifier information is a value obtained by calculating the MAC address of the second communication node by the first communication node according to the second preset algorithm. If one AP knows the MAC addresses of other APs, the AP may directly use the second preset algorithm to calculate the second identifier information of other APs. AP2 and AP3 may also directly send, to AP1, the second identifier information calculated and obtained by using the second preset algorithm. In an embodiment, the first preset algorithm is the same as the second preset algorithm. In an embodiment, the first preset algorithm is different from the second preset algorithm. In an embodiment, in the case where the first preset algorithm is the same as the second preset algorithm, the same MAC address is calculated, and the obtained first identifier information is the same as the second identifier information. When an AP is a sender, the calculated value of the MAC address is used as the first identifier information. When an AP is a receiver, the calculated value of the MAC address is used as the second identifier information.

In an embodiment, the second identifier is obtained by the first communication node from the predetermined value range of the AID configured to be assigned to the third communication node. In the case where the first communication node and the second communication node are APs, and the third communication node is an STA, the second identifier assigns, to the APs, several values within the predetermined value range of the AID configured to be assigned to the STA. For example, the predetermined value range of the AID is 0 to N. 0 to M (M is less than or equal to N) values within the value range or N-M to N values within the value range may be assigned to and used by the APs. In this embodiment, the AID assigned to each AP may be determined by mutual negotiations among the APs. Alternatively, the AID assigned to each AP may be assigned by a specific entity in the network, such as a central node. Alternatively, the AID assigned to each AP is obtained from a one-to-one mapping between low-to-high (or high-to-low) ranked sizes of MAC addresses of the APs and positively ordered (or negatively ordered) AID values assigned to the APs. Through this method, the first communication node obtains the AID used by the second communication node, or the second communication node sends its own AID to the first communication node.

In an embodiment, after an AID is assigned to each AP, when an AP is a sender, the AID is used as the first identifier information, and when an AP is a receiver, the AID is used as the second identifier information.

In an embodiment, in a case where a group including multiple second communication nodes exists, the wireless signal carries the second identifier information. The second identifier information is one of a preset group MAC address, a calculated value of a group MAC address obtained according to a third preset algorithm, or a preset group identifier value. The group identifier value is configured to identify the group including multiple second communication nodes. In this embodiment, the PPDU sent by AP1 carries the second identifier information. In the case where the group including multiple second communication nodes exists, the second identifier information may be a preset group MAC address value, a calculated value of the group MAC address obtained according to the third preset algorithm, a preset AID value, or a preset group identifier value to identify the multi-AP group including AP2 and AP3.

In this embodiment, there are multiple methods for obtaining the third preset algorithm. For example, the third preset algorithm may be one of the following methods: partially intercepting the MAC address, such as intercepting a high N bit or intercepting a low N bit, performing the hash operation on the MAC address, or performing the exclusive-OR operation on the MAC address and a predetermined string. In an embodiment, the third preset algorithm is the same as the first preset algorithm and/or the second preset algorithm. Alternatively, the third preset algorithm is different from the first preset algorithm and/or the second preset algorithm. In this embodiment, the third preset algorithm may be the same as the first preset algorithm. The third preset algorithm may also be the same as the second preset algorithm. The third preset algorithm may also be the same as the first preset algorithm and the second preset algorithm at the same time. In an embodiment, the third preset algorithm may be different from the first preset algorithm. The third preset algorithm may also be different from the second preset algorithm. The third preset algorithm may also be different from the first preset algorithm and the second preset algorithm at the same time.

In an embodiment, in the case where the group including multiple second communication nodes exists, before the wireless signal that includes the trigger frame is sent to one or more second communication nodes, the sending data method further includes determining information of each second communication node included in the group including multiple second communication nodes, determining the third identifier information used by the group including multiple second communication nodes, and sending the third identifier information to each second communication node of the multi-AP group. In an embodiment, in the case where the first communication node and the second communication node are APs, if the multi-AP group exists, before the first communication node sends the trigger frame, information of each AP included in the multi-AP group and the third identifier information used by the multi-AP group are determined, and the third identifier information is sent to each AP of the multi-AP group.

In an embodiment, the first identifier information, the second identifier information and the third identifier information are located in one of the physical layer signaling domain of the PPDU including the trigger frame, the MAC layer signaling domain of the trigger frame or the MAC layer frame body of the trigger frame.

In an embodiment, the third identifier information is used to identify that the trigger frame is configured to trigger the second communication node to start transmission. In an embodiment, the third identifier information indicates that the trigger frame is a frame sent by the first communication node to the second communication node. Alternatively, the third identifier information indicates that a frame type of the trigger frame is a frame that is configured to trigger the second communication node to start transmission to the third communication node. In this embodiment, AP1 sends trigger frames to AP2 and AP3 to trigger AP2 and AP3 to start to transmit data to STA1 at the same time. The trigger frames carry the third identifier information. The third identifier information is located in the physical layer signaling domain of the PPDU including the frames. The third identifier information indicates that the frames are frames from an AP (that is, AP1) to APs (that is, AP2 and AP3). The frames are configured to trigger receiving APs (that is, AP2 and AP3) to start transmission to the third communication node. In an embodiment, the third identifier information is located in the MAC layer signaling domain of the frames. The third identifier information indicates that the frame types of the frames are frames in which an AP (that is, AP1) triggers other APs (that is, AP2 and AP3) to start transmission to the third communication node (STA1).

Figure 6:
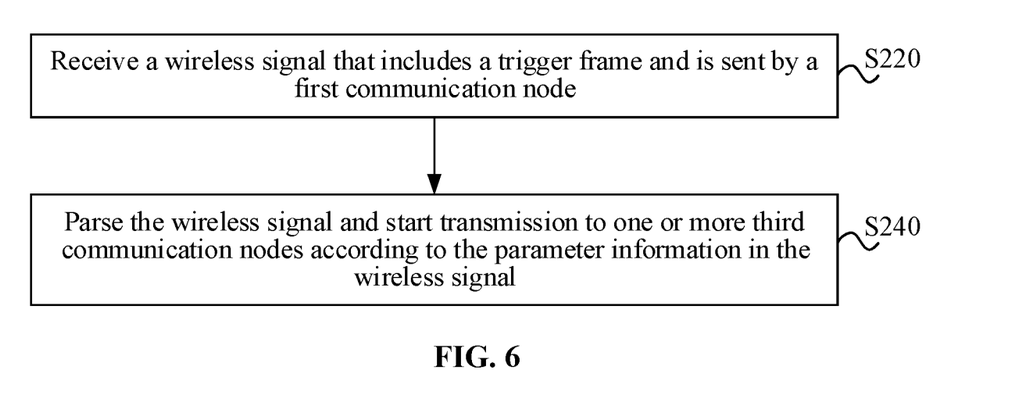
FIG. 6 is a flowchart of a data receiving method according to an embodiment of the present application.

FIG. 6 is a flowchart of a data receiving method according to an embodiment of the present application. This embodiment may be performed by a second communication node. The second communication node may be an AP.

As shown in FIG. 6, the method provided in this embodiment includes S220 to S240.

In S220, a wireless signal that includes a trigger frame and that is sent by a first communication node is received.

The trigger frame is configured to trigger one or more second communication nodes to start transmission.

In S240, the wireless signal is parsed, and the transmission to one or more third communication nodes is started according to the parameter information in the wireless signal.

The wireless signal carries one or more of first identifier information, second identifier information or third identifier information. The first identifier information is used to identify the sender of the trigger frame. The second identifier information is used to identify the receiver of the trigger frame. The third identifier information is used to identify that the trigger frame is configured to trigger the second communication node to start transmission.

In this embodiment, one or more second communication nodes receive the wireless signal that includes the trigger frame and is sent by the first communication node. The wireless signal is parsed. Data or signaling is started the transmission to one or more third communication nodes according to the parameter information in the wireless signal.

In an embodiment, in the case where the wireless signal includes the first identifier information, that the wireless signal is parsed, and the transmission to one or more third communication nodes is started according to the parameter information in the wireless signal includes determining whether the first identifier information indicates that the sender of a PPDU is the first communication node; in the case where the first identifier information indicates that the sender of the PPDU is the first communication node, parsing the wireless signal; determining whether the second communication node is the receiver of the wireless signal; and in the case where the second communication node is the receiver of the wireless signal, performing transmission to the third communication node according to the parameter of the wireless signal. In this embodiment, in a case where the PPDU includes the first identifier information, the first identifier information indicates that the sender of the PPDU is the first communication node. Since the second communication node can identify the first identifier information, the second communication node further continues to parse the PPDU to determine whether the second communication node is the receiver of the PPDU. In the case where the second communication node is the receiver, the data transmission or the signaling transmission to the third communication node is performed according to the parameter of the PPDU. When the third communication node receives the PPDU, the first identifier information is not identified. Therefore, the continuous parsing of the PPDU is stopped, and the purpose of saving power is achieved. In this embodiment, the parameter information in the wireless signal includes but is not limited to the moment when the second communication node starts sending, the time-frequency domain resource location used by the second communication node when sending, the time-frequency domain correction parameter of the second communication node, and the modulation and coding scheme used by the second communication node when sending.

In an embodiment, in the case where the wireless signal includes the second identifier information, that the wireless signal is parsed, and the transmission to one or more third communication nodes is started according to the identifier information of the wireless signal includes determining whether the second identifier information indicates that the receiver of the wireless signal is the second communication node or a group including multiple second communication nodes; and in the case where the second identifier information indicates that the receiver of the wireless signal is the second communication node or the group including multiple second communication nodes, performing the transmission to the third communication node according to the parameter of the wireless signal. In this embodiment, in a case where the PPDU includes the second identifier information, the second identifier information indicates that the receiver of the PPDU is the second communication node or a multi-AP group including multiple second communication nodes. The second communication node performs the transmission to the third communication node according to the parameter of the PPDU. Thus, in the case where the receiver of the PPDU is the second communication node, the second communication node parses the PPDU. In this manner, the PPDU is prevented from being parsed by other communication nodes (second communication nodes and third communication nodes that are not receivers), and other nodes achieve the purpose of saving power.

In an embodiment, in the case where the wireless signal includes the second identifier information, the data receiving method further includes sending, to the first communication node, a value obtained by calculating the MAC address of the second communication node according to a second preset algorithm; or sending, to the first communication node, a value obtained by the second communication node from the predetermined value range of an AID configured to be assigned to the third communication node. In an embodiment, the second identifier information is the value obtained by calculating the MAC address of the second communication node according to the second preset algorithm or the value obtained by the second communication node from the predetermined value range of the AID configured to be assigned to the third communication node. The second communication node sends, to the first communication node, the value that is corresponded to the second identifier information and calculated by the second communication node to make the first communication node store the second identifier information and to identify the receiver (that is, the receiving address) of the trigger frame.

In an embodiment, in the case where the wireless signal includes the third identifier information, that the wireless signal is parsed, and the transmission to one or more third communication nodes is started according to the parameter information of the trigger frame includes determining whether the third identifier information indicates that the trigger frame is a frame sent by the first communication node to the second communication node, or determining whether the third identifier information indicates that a frame type of the trigger frame is a frame that is configured to trigger the second communication node to start transmission to the third communication node; in the case where the third identifier information indicates that the trigger frame is the frame sent by the first communication node to the second communication node, or the third identifier information indicates that the frame type of the trigger frame is the frame that is configured to trigger the second communication node to start transmission to the third communication node, parsing the wireless signal; determining whether the second communication node is the receiver of the wireless signal; and in the case where the second communication node is the receiver of the wireless signal, performing the transmission to the third communication node according to the parameter of the wireless signal. In this embodiment, in a case where the PPDU includes the third identifier information, the third identifier information indicates that the PPDU is sent by an AP and configured to trigger other APs to start transmission. The second communication node parses the PPDU to determine whether the second communication node is the receiver of the PPDU. In the case where the second communication node is the receiver, the second communication node performs the transmission to the third communication node according to the parameter of the PPDU. Thus, the third identifier information indicates that the sender and the receiver are APs, or that the frame type is a frame in which an AP triggers an AP to send. In this manner, the PPDU is prevented from being parsed by the third communication node (for example, an STA), and the third communication node achieves the purpose of saving power.

In the data receiving methods applied to the second communication node disclosed in this embodiment, the interpretation of the method for obtaining the first identifier information and the second identifier information and the interpretation of the first preset algorithm, the second preset algorithm and the third preset algorithm are described in the previous embodiments, and the details are not repeated here.

Figure 7:
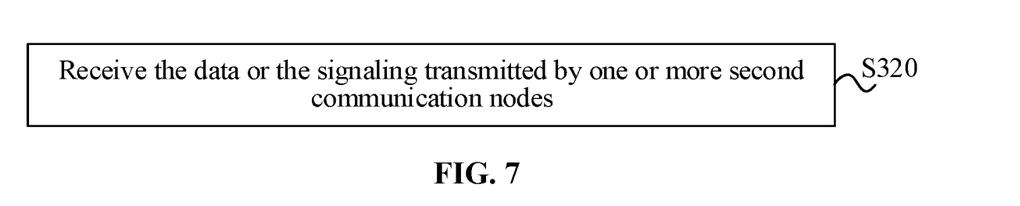
FIG. 7 is a flowchart of another data receiving method according to an embodiment of the present application.

FIG. 7 is a flowchart of another data receiving method according to an embodiment of the present application. This embodiment is performed by a third communication node. The third communication node may be an STA or user equipment (UE).

As shown in FIG. 7, the method provided in this embodiment includes S320.

In S320, the data or the signaling transmitted by one or more second communication nodes is received.

In this embodiment, after a first communication node sends a wireless signal to one or more second communication nodes, the second communication node triggers the second communication node to start to transmit data or signaling to one or more third communication nodes according to a trigger frame in the wireless signal.

In an embodiment, the data receiving method applied to the third communication node further includes sending the maximum number of second communication nodes supportable by the third communication node to the first communication node In this embodiment, during the scanning and association between the third communication node and the first communication node, the maximum number of second communication nodes supportable by the third communication node is sent to the first communication node. In this manner, when the transmission of multiple second communication nodes is performed, the first communication node can take the maximum number of second communication nodes as a condition when configuring other second communication nodes for the third communication node.

Figure 8:
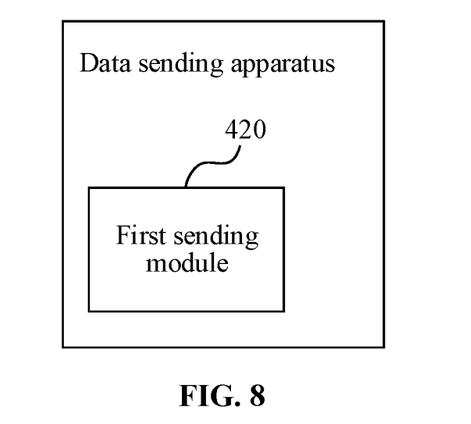
FIG. 8 is a block diagram of a data sending apparatus according to an embodiment of the present application.

FIG. 8 is a block diagram of a data sending apparatus according to an embodiment of the present application. The data sending apparatus in this embodiment may be performed by a first communication node. As shown in FIG. 8, the data sending apparatus in this embodiment includes a first sending module 420 configured to send a wireless signal that includes a trigger frame to one or more second communication nodes.

The trigger frame is configured to trigger one or more second communication nodes to start transmission.

The wireless signal carries one or more of first identifier information, second identifier information or third identifier information. The first identifier information is used to identify the sender of the trigger frame. The second identifier information is used to identify the receiver of the trigger frame. The third identifier information is used to identify that the trigger frame is configured to trigger the second communication node to start transmission.

The data sending apparatus provided in this embodiment is configured to implement the data sending method of the embodiment shown in FIG. 1. The implementation principle and the technical effect of the data sending apparatus provided in this embodiment are similar, and the details are not repeated here.

In an embodiment, the first communication node is a node capable of wired or wireless communication with one or more second communication nodes.

In an embodiment, the data sending apparatus further includes a third receiving module configured to receive the maximum number of second communication nodes sent by a third communication node. The maximum number of second communication nodes is the maximum value of the number of the second communication nodes supportable by the third communication node.

In an embodiment, in the case where the wireless signal carries the first identifier information, the method for obtaining the first identifier information includes one of the following: obtaining the first identifier information by calculating the medium access control (MAC) address of the first communication node according to a first preset algorithm or obtaining the first identifier information from the predetermined value range of an association identifier (AID) configured to be assigned to the third communication node.

In an embodiment, in the case where the wireless signal carries the second identifier information, the method for obtaining the second identifier information includes one of the following: obtaining the second identifier information by calculating the MAC address of the second communication node according to a second preset algorithm, obtaining the second identifier information from the predetermined value range of the AID configured to be assigned to the third communication node, receiving the value obtained by calculating the MAC address of the second communication node according to the second preset algorithm, or receiving the value obtained by the second communication node from the predetermined value range of the AID configured to be assigned to the third communication node.

In an embodiment, the second preset algorithm is the same as the first preset algorithm.

Alternatively, the second preset algorithm is different from the first preset algorithm.

In an embodiment, in a case where a group including multiple second communication nodes exists, the wireless signal carries the second identifier information. The second identifier information is one of a preset group MAC address, a calculated value of a group MAC address obtained according to a third preset algorithm, or a preset group identifier value. The group identifier value is configured to identify the group including multiple second communication nodes.

In an embodiment, the third preset algorithm is the same as the first preset algorithm and/or the second preset algorithm.

Alternatively, the third preset algorithm is different from the first preset algorithm and/or the second preset algorithm.

In an embodiment, the data sending apparatus further includes a processor and a second sending module.

The processor is configured to, in the case where the group including multiple second communication nodes exists, determine information of each second communication node included in the group including multiple second communication nodes before the wireless signal that includes the trigger frame is sent to one or more second communication nodes.

The processor is further configured to determine the third identifier information used by the group including multiple second communication nodes.

The second sending module is configured to send the third identifier information to each second communication node of a multi-AP group.

In an embodiment, the first identifier information, the second identifier information and the third identifier information are located in one of the physical layer signaling domain of a PPDU including the trigger frame, the MAC layer signaling domain of the trigger frame or the MAC layer frame body of the trigger frame.

In an embodiment, the third identifier information is used to identify that the trigger frame is configured to trigger the second communication node to start transmission. In this method, the third identifier information indicates that the trigger frame is a frame sent by the first communication node to the second communication node.

Alternatively, the third identifier information indicates that a frame type of the trigger frame is a frame that is configured to trigger the second communication node to start transmission to the third communication node.

In an embodiment, the first communication node and the second communication node are access points, and the third communication node is a non-AP station.

Figure 9:
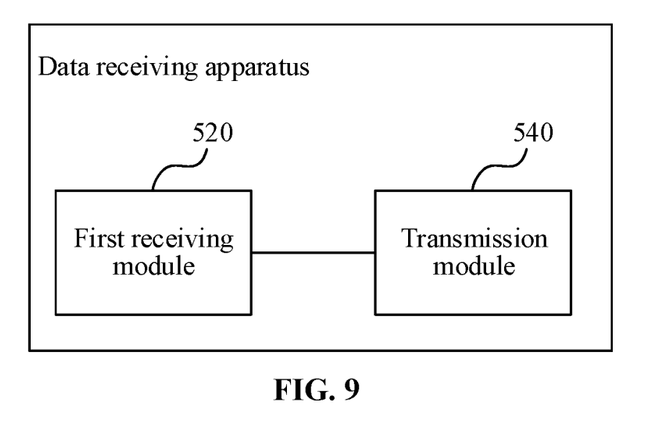
FIG. 9 is a block diagram of a data receiving apparatus according to an embodiment of the present application.

FIG. 9 is a block diagram of a data receiving apparatus according to an embodiment of the present application. The data receiving apparatus in this embodiment may be performed by a second communication node. As shown in FIG. 9, the data receiving apparatus in this embodiment includes a first receiving module 520 and a transmission module 540.

The first receiving module 520 is configured to receive a wireless signal that includes a trigger frame and is sent by a first communication node. The trigger frame is configured to trigger one or more second communication nodes to start transmission.

The transmission module 540 is configured to parse the wireless signal and start transmission to one or more third communication nodes according to the parameter information in the wireless signal. The wireless signal carries one or more of first identifier information, second identifier information or third identifier information. The first identifier information is used to identify the sender of the trigger frame. The second identifier information is used to identify the receiver of the trigger frame. The third identifier information is used to identify that the trigger frame is configured to trigger the second communication node to start transmission.

The data receiving apparatus provided in this embodiment is configured to implement the data receiving method of the embodiment shown in FIG. 6. The implementation principle and the technical effect of the data receiving apparatus provided in this embodiment are similar, and the details are not repeated here.

In an embodiment, in the case where the wireless signal includes the first identifier information, the transmission module 540 includes a first determination unit, a first parsing unit, a second determination unit and a first execution unit.

The first determination unit is configured to determine whether the first identifier information indicates that the sender of a PPDU is the first communication node.

The first parsing unit is configured to parse the wireless signal in the case where the first identifier information indicates that the sender of the PPDU is the first communication node.

The second determination unit is configured to determine whether the second communication node is the receiver of the wireless signal.

The first execution unit is configured to perform the transmission to the third communication node according to the parameter of the wireless signal in the case where the second communication node is the receiver of the wireless signal.

In an embodiment, in the case where the wireless signal includes the second identifier information, the transmission module 540 includes a third determination unit and a second execution unit.

The third determination unit is configured to determine whether the second identifier information indicates that the receiver of the wireless signal is the second communication node or a group including multiple second communication nodes.

The second execution unit is configured to perform the transmission to the third communication node according to the parameter of the wireless signal in the case where the receiver of the wireless signal is the second communication node or the group including multiple second communication nodes.

In an embodiment, in the case where the wireless signal includes the second identifier information, the data receiving apparatus further includes a third sending module.

The third sending module is configured to send, to the first communication node, a value obtained by calculating the MAC address of the second communication node according to a second preset algorithm.

Alternatively, the third sending module is further configured to send, to the first communication node, a value obtained by the second communication node from the predetermined value range of an AID configured to be assigned to the third communication node.

In an embodiment, in the case where the wireless signal includes the third identifier information, the transmission module includes a fourth determination unit, a second parsing unit, a fifth determination unit and a third execution unit.

The fourth determination unit is configured to determine whether the third identifier information indicates that the trigger frame is a frame sent by the first communication node to the second communication node or determine whether the third identifier information indicates that a frame type of the trigger frame is a frame that is configured to trigger the second communication node to start transmission to the third communication node.

The second parsing unit is configured to parse the wireless signal in the case where the third identifier information indicates that the trigger frame is the frame sent by the first communication node to the second communication node, or the third identifier information indicates that the frame type of the trigger frame is the frame that is configured to trigger the second communication node to start transmission to the third communication node.

The fifth determination unit is configured to determine whether the second communication node is the receiver of the wireless signal.

The third execution unit is configured to perform the transmission to the third communication node according to the parameter of the wireless signal in the case where the second communication node is the receiver of the wireless signal.

Figure 10:
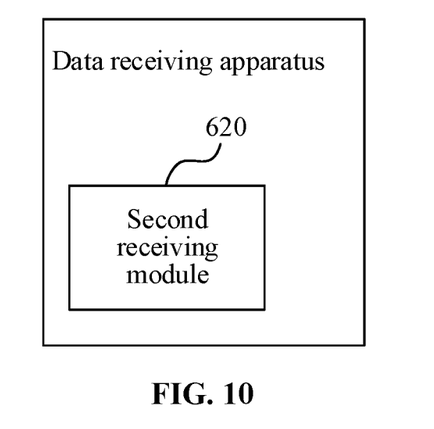
FIG. 10 is a block diagram of another data receiving apparatus according to an embodiment of the present application.

FIG. 10 is a block diagram of another data receiving apparatus according to an embodiment of the present application. The data receiving apparatus in this embodiment may be performed by a third communication node. As shown in FIG. 10, the data receiving apparatus in this embodiment includes a second receiving module 620 configured to receive the data or the signaling transmitted by one or more second communication nodes.

The data receiving apparatus provided in this embodiment is configured to implement the data receiving method of the embodiment shown in FIG. 7. The implementation principle and the technical effect of the data receiving apparatus provided in this embodiment are similar, and the details are not repeated here.

In an embodiment, the data receiving apparatus applied to the third communication node further includes a fourth sending module configured to send, to a first communication node, the maximum number, supported by the third communication node, of the second communication nodes.

The maximum number of second communication nodes is the maximum value of the number of the second communication nodes supportable by the third communication node.

Figure 11:
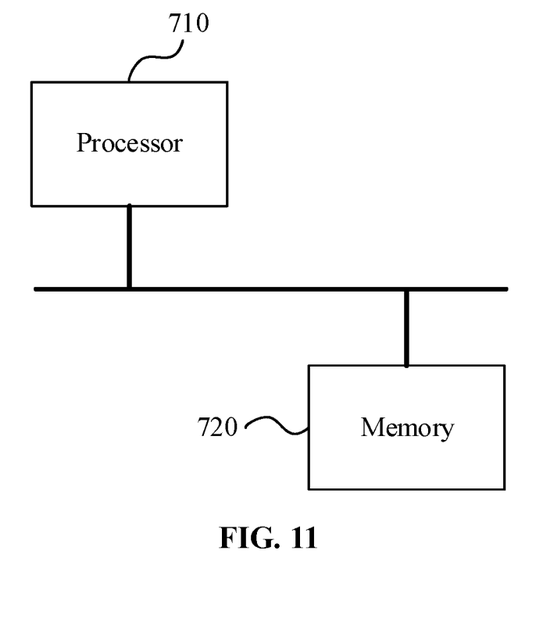
FIG. 11 is a diagram illustrating the structure of a device according to an embodiment of the present application.

FIG. 11 is a diagram illustrating the structure of a device according to an embodiment of the present application. As shown in FIG. 11, the device provided in this application, includes a processor 710 and a memory 720. The number of processors 710 in the device may be one or more. A description is given with reference to FIG. 11 by using an example in which there is one processor 710. The number of memories 720 in the device may be one or more. A description is given with reference to FIG. 11 by using an example in which there is one memory 720. The processor 710 and the memory 720 of the device may be connected through a bus or other manners. A description is given with reference to FIG. 11 by using an example in which the processor 710 and the memory 720 of the device are connected through the bus.

In an embodiment, the device may be a first communication node.

As a computer-readable storage medium, the memory 720 may be configured to store a software program, a computer-executable program and a computer-executable module, such as a program instruction/module corresponding to the first communication node according to any embodiment of the present application (for example, a first sending module in a data sending apparatus). The memory 720 may include a program storage region and a data storage region. The program storage region may store an operating system and an application program required by at least one function. The data storage region may store data created according to the use of the device. Additionally, the memory 720 may include a high-speed random-access memory and may further include a non-volatile memory, such as at least one disk memory, at least one flash memory or other non-volatile solid-state memories. In some embodiments, the memory 720 may further include memories that are remotely disposed relative to the processor 720. These remote memories may be connected to the first communication node through a network. Examples of the network include, but are not limited to, the Internet, an intranet, a local area network, a mobile communication network and a combination thereof.

The first communication node provided above may be configured to perform the data sending method applied to the first communication node provided by any previous embodiment and have corresponding functions and effects.

When the device is a second communication node, the program stored in the corresponding memory 720 may be a program instruction/module corresponding to the data receiving method applied to the second communication node provided by the embodiments of the present application. The processor 710 performs one or more function applications and data processing of a computer device by running software programs, instructions and modules stored in the memory 720, that is, the data receiving method applied to the second communication node in the previous method embodiments is performed. It is to be understood that when the device is the second communication node, the device can perform the data receiving method applied to the second communication node provided by any embodiment of the present application and has corresponding functions and effects.

When the device is a third communication node, the program stored in the corresponding memory 720 may be a program instruction/module corresponding to the data receiving method applied to the third communication node provided by the embodiments of the present application. The processor 710 performs one or more function applications and data processing of the computer device by running the software programs, the instructions and the modules stored in the memory 720, that is, the data receiving method applied to the third communication node in the previous method embodiments is performed. It is to be understood that when the device is the third communication node, the device can perform the data receiving method applied to the third communication node provided by any embodiment of the present application and has corresponding functions and effects.

The embodiments of the present application further provide a storage medium including a computer-executable instruction. The computer-executable instruction is configured to perform a data sending method when a computer processor is performed. The method is applied to a first communication node. The method includes sending a wireless signal that includes a trigger frame to one or more second communication nodes. The trigger frame is configured to trigger one or more second communication nodes to start transmission.

The wireless signal carries one or more of first identifier information, second identifier information or third identifier information. The first identifier information is used to identify the sender of the trigger frame. The second identifier information is used to identify the receiver of the trigger frame. The third identifier information is used to identify that the trigger frame is configured to trigger the second communication node to start transmission.

The embodiments of the present application further provide a storage medium including a computer-executable instruction. The computer-executable instruction is configured to perform a data receiving method when the computer processor is performed. The method is applied to the second communication node. The method includes receiving the wireless signal that includes the trigger frame and is sent by the first communication node, parsing the wireless signal and starting transmission to one or more third communication nodes according to the parameter information in the wireless signal. The trigger frame is configured to trigger one or more second communication nodes to start transmission.

The wireless signal carries one or more of the first identifier information, the second identifier information or the third identifier information. The first identifier information is used to identify the sender of the trigger frame. The second identifier information is used to identify the receiver of the trigger frame. The third identifier information is used to identify that the trigger frame is configured to trigger the second communication node to start transmission.

The embodiments of the present application further provide a storage medium including a computer-executable instruction. The computer-executable instruction is configured to perform a data receiving method when the computer processor is performed. The method is applied to a third communication node. The method includes receiving data or signaling transmitted by one or more second communication nodes.

It is to be understood by those skilled in the art that the term "user device" covers any suitable type of wireless user devices, for example, a mobile phone, a portable data processing apparatus, a portable web browser, or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, although the present application is not limited thereto.

The embodiments of the present application may be implemented with the arrangement in which a data processor of a mobile apparatus performs computer program instructions. The implementation, for example, may be in a processor entity or in hardware, or in a combination of software and hardware. The computer program instructions may be assembly instructions, instruction set architecture (ISA) instructions, machine instructions, machine-related instructions, micro codes, firmware instructions, state setting data, or source codes or object codes written in any combination of one or more programming languages.

The block diagrams of any logic flows in drawings of the present application may represent program steps, or may represent interconnected logic circuits, modules, and functions, or may represent a combination of program steps, logic circuits, modules, and functions. The computer program may be stored in a memory. The memory may be in any type suitable for the local technical environment and may be implemented using any suitable data storage technology, for example, but not limited to, a read-only memory (ROM), a random-access memory (RAM), and an optical memory apparatus and system [a digital video disc (DVD) or a compact disc (CD)]. A computer-readable medium may include a non-transitory storage medium. The data processor may be in any type suitable for the local technical environment, for example, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

What is claimed is:

1. A data sending method, applied to a first communication node, comprising:
   sending a wireless signal comprising a trigger frame to at least one second communication node, wherein the trigger frame is configured to trigger the at least one second communication node to start transmission; and
   the wireless signal carries at least one of first identifier information, second identifier information or third identifier information, wherein the first identifier information is used to identify a sender of the trigger frame, the second identifier information is used to identify a receiver of the trigger frame, and the third identifier information is used to identify that the trigger frame is configured to trigger the at least one second communication node to start transmission; and
   receiving a maximum number of second communication nodes sent by a third communication node, wherein the maximum number of second communication nodes is a maximum value of a number of the second communication nodes supportable by the third communication node.

2. The data sending method according to claim 1, wherein the first communication node is a node capable of wired or wireless communication with the at least one second communication node.

3. The data sending method according to claim 1, wherein in a case where the wireless signal carries the first identifier information, a value of the first identifier information is obtained by one of:
   obtaining the first identifier information by calculating a medium access control (MAC) address of the first communication node according to a first preset algorithm; or
   obtaining the first identifier information from a predetermined value range of an association identifier (AID) configured to be assigned to a third communication node.

4. The data sending method according to claim 1, wherein in a case where the wireless signal carries the second identifier information, the second identifier information is obtained by one of:
   obtaining the second identifier information by calculating a MAC address of a second communication node according to a second preset algorithm;
   obtaining the second identifier information from a predetermined value range of an AID assigned to a third communication node;
   receiving a value obtained by calculating a MAC address of a second communication node by the second communication node according to a second preset algorithm; or
   receiving a value obtained by a second communication node from a predetermined value range of an AID assigned to a third communication node,
   wherein the second preset algorithm is the same as a first preset algorithm; or
   the second preset algorithm is different from a first preset algorithm.

5. The data sending method according to claim 1, wherein in a case where a group comprising a plurality of second communication nodes exists, the wireless signal carries the second identifier information, and the second identifier information is one of a preset group MAC address, a calculated value of a group MAC address obtained according to a third preset algorithm, or a preset group identifier value, wherein the group identifier value is configured to identify the group comprising the plurality of second communication nodes;
   wherein the third preset algorithm is the same as at least one of a first preset algorithm or a second preset algorithm; or
   the third preset algorithm is different from at least one of a first preset algorithm or a second preset algorithm.

6. The data sending method according to claim 5, in a case where the group comprising the plurality of second communication nodes exists, before sending the wireless signal comprising the trigger frame to the at least one second communication node, the method further comprising:
   determining information of each second communication node comprised in the group comprising the plurality of second communication nodes;
   determining third identifier information used by the group comprising the plurality of second communication nodes; and
   sending the third identifier information to each second communication node in the group comprising the plurality of second communication nodes.

7. The data sending method according to claim 1, wherein the first identifier information, the second identifier information and the third identifier information are located in one of a physical layer signaling domain of a physical layer protocol data unit (PPDU) comprising the trigger frame, an MAC layer signaling domain of the trigger frame, or an MAC layer frame body of the trigger frame.

8. The data sending method according to claim 1, wherein the third identifier information is used to identify that the trigger frame is configured to trigger the at least one second communication node to start transmission comprises:
   the third identifier information indicates that the trigger frame is a frame sent by the first communication node to the at least one second communication node; or
   the third identifier information indicates that a frame type of the trigger frame is a frame that is configured to trigger the at least one second communication node to start transmission to a third communication node.

9. The data sending method according to claim 1, wherein the first communication node and the at least one second communication node each is an access point, and the third communication node is a non-access point.

10. A data sending apparatus, applied to a first communication node, comprising:
    a processor and a memory storing processor-executable instructions which, when executed by the processor, are configured to perform the data sending method of claim 1.

11. A data receiving method, applied to a second communication node, comprising:
    receiving a wireless signal comprising a trigger frame sent by a first communication node, wherein the trigger frame is configured to trigger at least one second communication node to start transmission; and
    parsing the wireless signal and starting transmission to at least one third communication node according to parameter information in the wireless signal, wherein the wireless signal carries at least one of first identifier information, second identifier information or third identifier information, wherein the first identifier information is used to identify a sender of the trigger frame, the second identifier information is used to identify a receiver of the trigger frame, and the third identifier information is used to identify that the trigger frame is configured to trigger the at least one second communication node to start transmission;
    wherein in a case where the wireless signal comprises the second identifier information, parsing the wireless signal and starting transmission to the at least one third communication node according to the parameter information in the wireless signal comprise:
    determining whether the second identifier information indicates that a receiver of the wireless signal is the second communication node, or determining whether the second identifier information indicates that the receiver of the wireless signal is a group comprising a plurality of second communication nodes; and
    in a case where the second identifier information indicates that the receiver of the wireless signal is the second communication node or the group comprising the plurality of second communication nodes, performing the transmission to the at least one third communication node according to the parameter information in the wireless signal.

12. The data receiving method according to claim 11, wherein in a case where the wireless signal comprises the first identifier information, parsing the wireless signal and starting transmission to the at least one third communication node according to the parameter information in the wireless signal comprise:
- determining whether the first identifier information indicates that a sender of the wireless signal is the first communication node;
- in a case where the first identifier information indicates that the sender of the wireless signal is the first communication node, parsing the wireless signal;
- determining whether the second communication node is a receiver of the wireless signal; and
- in a case where the second communication node is the receiver of the wireless signal, performing the transmission to the at least one third communication node according to the parameter information in the wireless signal.

13. The data receiving method according to claim 11, in a case where the wireless signal comprises the second identifier information, the method further comprising:
- sending, to the first communication node, a value obtained by calculating a medium access control (MAC) address of the second communication node by the second communication node according to a second preset algorithm; or
- sending, to the first communication node, a value obtained by the second communication node from a predetermined value range of an association identifier (AID) configured to be assigned to the at least one third communication node.

14. The data receiving method according to claim 11, wherein in a case where the wireless signal comprises the third identifier information, parsing the wireless signal and starting transmission to the at least one third communication node according to the parameter information in the wireless signal comprise:
- determining whether the third identifier information indicates that the trigger frame is a frame sent by the first communication node to the second communication node, or determining whether the third identifier information indicates that a frame type of the trigger frame is a frame that is configured to trigger the second communication node to start transmission to the at least one third communication node;
- in a case where the third identifier information indicates that the trigger frame is the frame sent by the first communication node to the second communication node, or the third identifier information indicates that the frame type of the trigger frame is the frame that is configured to trigger the second communication node to start transmission to the at least one third communication node, parsing the wireless signal;
- determining whether the second communication node is a receiver of the wireless signal; and
- in a case where the second communication node is the receiver of the wireless signal, performing the transmission to the at least one third communication node according to the parameter information in the wireless signal.

15. A data receiving apparatus, applied to a second communication node, comprising:
- a processor and a memory storing processor-executable instructions which, when executed by the processor, are configured to perform the data receiving method of claim 11.

16. A data receiving method, applied to a third communication node, comprising:
- receiving data or signaling transmitted by at least one second communication node, wherein the data or the signaling is transmitted by the second communication node in response to a trigger frame contained in a wireless signal in accordance with parameter information in the wireless signal, and the wireless signal is transmitted by a first communication node and received by the at least one second communication node, and wherein the wireless signal carries at least one of first identifier information, second identifier information or third identifier information, the first identifier information is used to identify a sender of the trigger frame, the second identifier information is used to identify a receiver of the trigger frame, and the third identifier information is used to identify that the trigger frame is configured to trigger the at least one second communication node to start transmission; and
- sending a maximum number of second communication nodes supportable by the third communication node to a first communication node, wherein the maximum number of second communication nodes is a maximum value of a number of the second communication nodes supportable by the third communication node.

17. A data receiving apparatus, applied to a third communication node, comprising:
- a processor and a memory storing processor-executable instructions which, when executed by the processor, are configured to perform the data receiving method of claim 16.

* * * * *